No. 840,084. PATENTED JAN. 1, 1907.
F. MÜLLER.
REFLECTOR.
APPLICATION FILED MAR. 18, 1904.

3 SHEETS—SHEET 1.

Witnesses:
A. D. Sawyer
Ultima Müller

Inventor:
Frederick Müller
by Henry J. Miller,
Attorney.

No. 840,084. PATENTED JAN. 1, 1907.
F. MÜLLER.
REFLECTOR.
APPLICATION FILED MAR. 18, 1904.

3 SHEETS—SHEET 2.

Witnesses:

Inventor:
Frederich Müller, by
Henry J. Miller
Attorney.

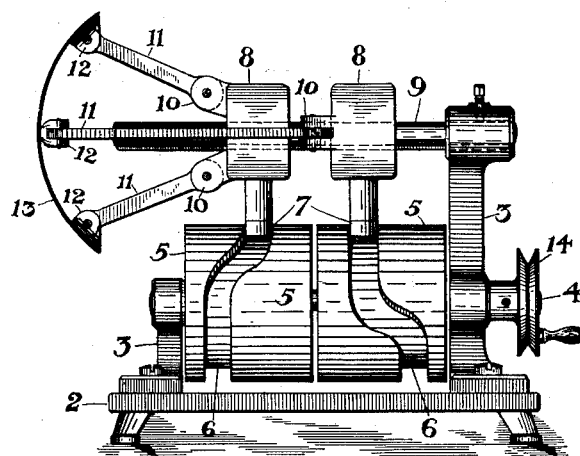
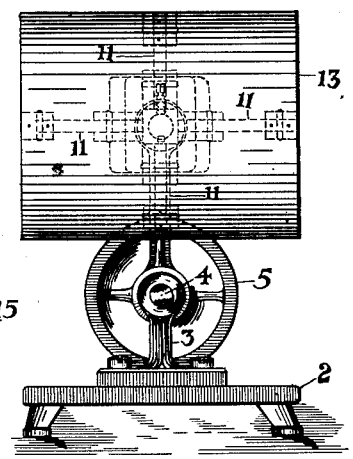
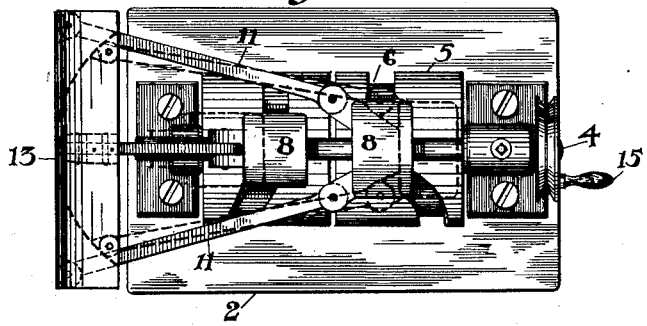

UNITED STATES PATENT OFFICE.

FRIEDERICH MÜLLER, OF ELIZABETH, NEW JERSEY.

REFLECTOR.

No. 840,084.　　　Specification of Letters Patent.　　　Patented Jan. 1, 1907.

Application filed March 18, 1904. Serial No. 198,859.

*To all whom it may concern:*

Be it known that I, FRIEDERICH MÜLLER, a citizen of the United States, residing at Elizabeth, in the county of Union and State of New Jersey, have invented certain new and useful Improvements in Reflectors, of which the following is a specification, reference being had therein to the accompanying drawings.

This invention relates to an improvement in that class of mirrors or reflectors which are designed more particularly for advertising or other exhibition purposes; and it has for its object to produce successively, in series, grotesque images, varying in respect of symmetry, of objects presented in front of the same.

The invention consists, essentially, in a mirror or reflector constructed to produce distorted images of an object placed within range of the same by varying the natural proportions in different directions in such manner that part of the images are symmetrical, while the intervening images are more or less unsymmetrical, and means for moving the same for producing successive images of the same object in different characters of distortion. The reflecting surface or surfaces employed for the purpose are preferably curved in one direction, and the means by which the direction of curvature in respect of the object to be reflected or some fixed point is changed may be either a circularly-moving frame or support, or, when it is formed upon a flexible plate capable of taking a highly-polished surface, by successively bending the plate upon which it is formed alternately in different directions.

The invention will be more fully understood by reference to the annexed drawings, in which—

Figure 1:
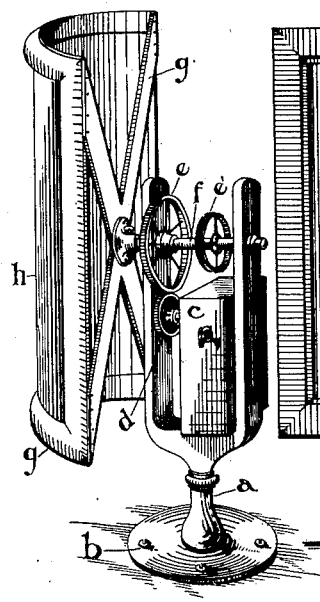
Figure 3:
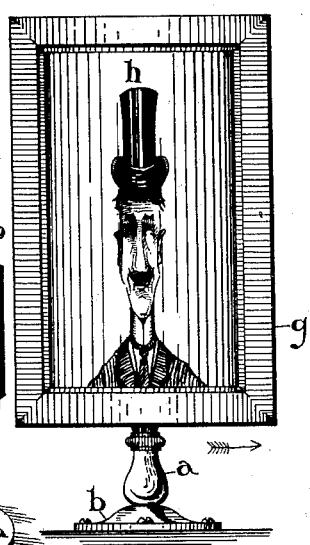
Figure 4:
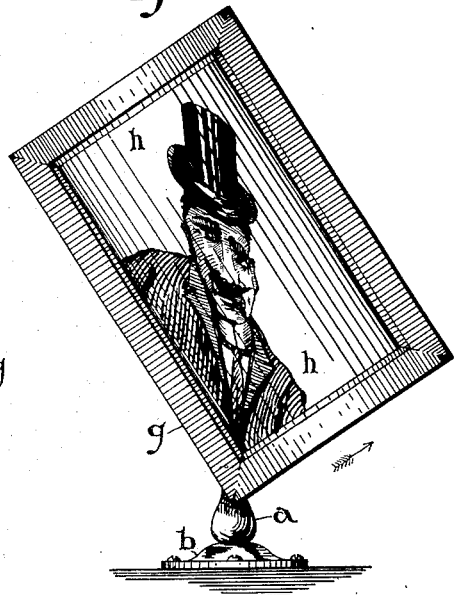
Figure 2:
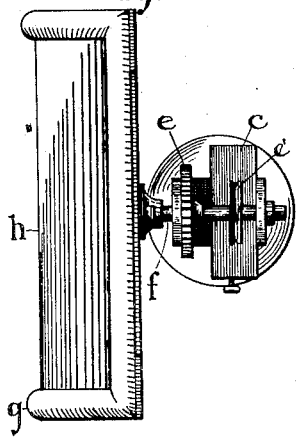
Figure 5:
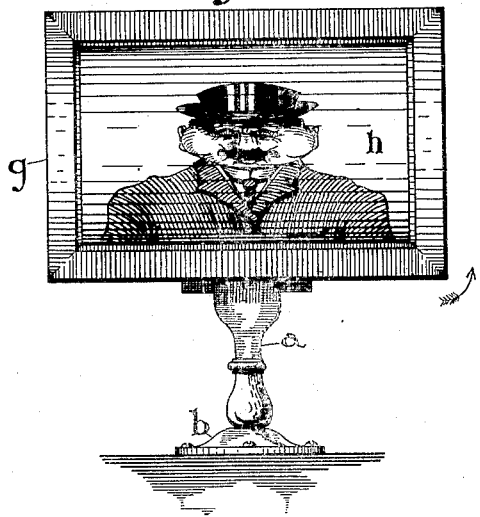
Figure 6:
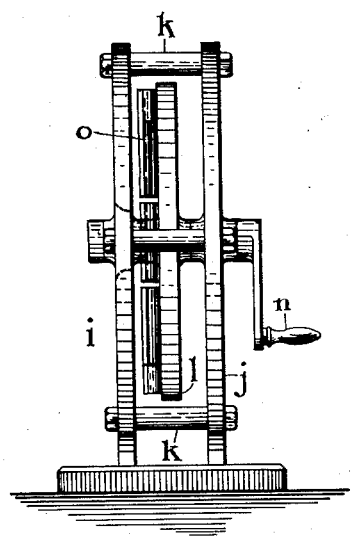
Figure 7:
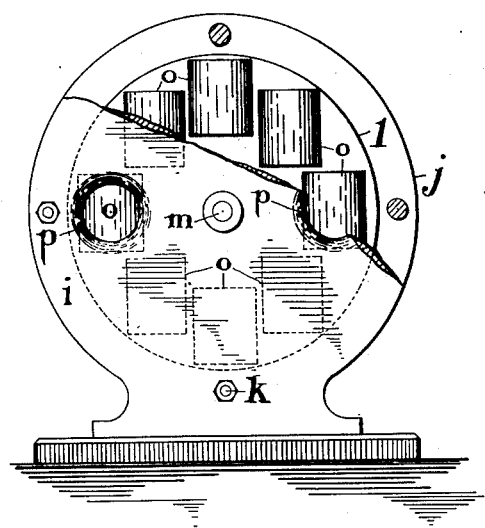
Figure 9:
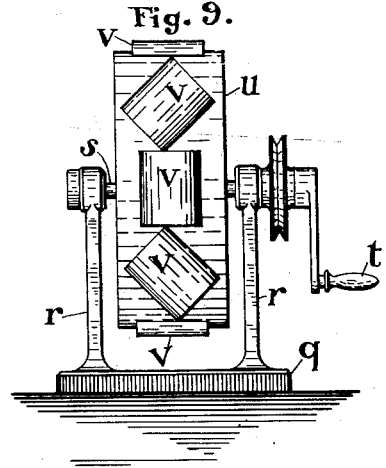
Figure 8:
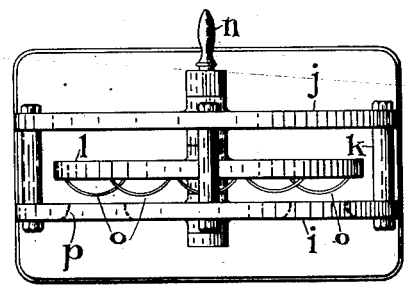

Figure 1 is a perspective view of the preferred embodiment of the improvement, and Fig. 2 a plan of the same. Figs. 3, 4, and 5 are front views of the apparatus in successive vertical, inclined, and horizontal positions of its single rectangular mirror, indicating the characters of the distorted images of an observer thereby produced. Figs. 6, 7, and 8 are respectively an edge, front, and plan view representing another embodiment of the improvement with a plurality of cylindrically-curved reflecting-surfaces carried by a rotary disk within a frame closed upon the front side, but having diametrically opposite inspection-openings through which distorted images of the observer may be seen similar to those of Figs. 3, 4, and 5. Fig. 9 is a view similar to Fig. 6 of another modification of the present improvement. Figs. 10, 11, and 12 are views similar to Figs. 6, 7, and 8, representing still another embodiment of the present invention, comprising a flexible plate affording the reflecting-surface with means for alternately bending the same in directions at right angles one to the other.

Referring to Figs. 1 to 5, inclusive, the standard $a$ of the apparatus therein represented is provided with the base $b$ and is bifurcated at its upper end to embrace the casing $c$ of a suitable clockwork mechanism, of which the driving-shaft carries a small cog-wheel $d$, meshing with a larger cog-wheel $e$, fixed upon a shaft $f$, journaled in the upper ends of the spaced members of the standard $a$ and carrying at the end adjacent the cog-wheel $e$ a rigid frame $g$, having the rectangular mirror $h$ with convex cylindrically-curved reflecting-face.

The particular construction of clockwork employed is evidently not material to the present invention, but that of the ordinary "nickel" clock at present in extensive use is suitable for the purpose, the escapement being preferably replaced by a continuously-moving regulator, as a rotary fan, and the hour-hand spindle carrying the cog-wheel $d$ in lieu of the hour-hand.

Instead of the clock-actuating mechanism the shaft $f$ may be rotated from a belt from a suitable motor led over the grooved pulley $e'$ upon said shaft, in which case the cog-wheels $d$ and $e$ could be dispensed with.

As will be evident by reference to Figs. 3, 4, and 5, the slow rotation of the mirror $h$ will cause the axis of curvature of its reflecting-face to constantly change its relation to the observer, and hence to produce a series of constantly-varying distorted images of such observer, those produced when the axis of curvature of the mirror is parallel with or transverse to the length of the reflected object being symmetrical, while those produced in the intermediate positions are more or less unsymmetrical, varying with the successive positions of the mirror. As the direction of greatest distortion is horizontal when the axis of curvature of the mirror is vertical, as in Fig. 3, the mirror when in such position represents the observer in practically his natural height, but in greatly-reduced breadth. As the mirror is inclined from the vertical in its continued rotation and until it reaches a horizontal position, the observer is represented therein as deformed in varying degrees and in different aspects until his symmetry is regained in the horizontal position of the mirror when his breadth is represented upon a natural scale, while his height is greatly reduced or foreshortened, as indicated in Fig. 5. From this point to the completion of a semirotation the series of images above described is substantially reproduced, but in reverse order, and each succeeding semirotation obviously produces a like series of images of the observer or other object in the range of the reflecting-face.

By reference to the drawings it will be seen that the supporting-shaft $f$ is disposed in such relation to the mirror $h$ that the axis of curvature of the mirror intersects its axis of rotation, whereby the succession of images of the object is produced of such gradual development as to appear like a single image directly in front of the center of the mirror, which varies constantly in degree and character of distortion.

In the apparatus represented in Figs. 6, 7, and 8 the frame is shown as formed of two spaced circular plates $i$ and $j$, rigidly connected together near their rims by the shouldered bolts $k$. Intermediate the frame-plates is a rotary disk $l$, mounted upon a supporting-shaft $m$, journaled in suitable bearings carried by the frame-plates, through one of which plates one end projects and carries a crank $n$ for turning the shaft and the disk $l$. This rotary disk is provided with a series of reflecting-sections composed of curved reflecting-faces which may be formed directly upon its front face, but preferably has an annular series of arched plates $o$, of metal or glass, suitably prepared, to afford the requisite reflecting-faces. The axes of curvature of all of the eight reflecting-sections are parallel, so that when the disk $l$ is revolved by turning the crank $n$ the successive sections $o$ pass behind the apertures $p$ in the front frame-plate with the same relative inclinations of their axes of curvature as and produce similar distorted images of the observer to those represented in Figs. 3, 4, and 5 before described. It is thus evidently immaterial to the principle of operation of the present improvement whether a simple reflecting member be rotated upon an axis at substantially the center of its area or whether a compound reflecting member be employed, having an annular series of sections arranged in such manner that the direction of curvature of the reflecting-faces of the adjacent sections will be in different angular relations to a fixed point past which they are moved in a circular path.

In the modification represented in Fig. 9 the frame portion comprises a base $q$ with standards $r$, in which are journaled the opposite end portions of the shaft $s$, having an actuating-crank $t$ and carrying a drum $u$, having a series of convexly-arched reflecting-sections $v$ with their direction of curvature disposed in varying relations with the axis of the shaft $s$, whereby the rotation of the shaft causes the production of a series of diversely-distorted images of the object lying successively in the ranges of the several reflecting-sections, as in the apparatus illustrated in Figs. 6, 7, and 8.

In the form of the improvement illustrated in Figs. 10, 11, and 12, the frame of the machine is constructed with the base 2, having pedestals 3, in which are mounted the opposite ends of a rotary shaft 4, carrying the cam-cylinders 5 with corresponding right and left grooves 6, entered by roller-studs 7, carried by the sliding blocks 8, fitted by spline-and-groove connections to the horizontal supporting-bar 9, sustained by one of the pedestals 3. Each of the blocks 8 is provided upon opposite sides of the supporting-bar 9 with a pair of ears 10, disposed in a line transversely of those of the other block, and such ears are connected by means of two pairs of links 11 with similar ears 12, correspondingly disposed upon the rear face and near the edges of a thin rectangular plate 13 of a flexible material capable of taking a high polish upon its front face which serves as a mirror. When the shaft 4 is slowly rotated by means of a belt applied to its pulley-wheel 14 from a suitable actuating-driver or by the operator's turning the crank-handle 15 upon such pulley-wheel, the simultaneous rotation of the cam-cylinders 5 causes a relative to-and-fro reciprocation of the blocks 8 upon their supporting-bar 9, and thereby produces the alternate bending of the reflecting-plate 13 in the planes of the links 11, as indicated in Fig. 12, wherein one extreme position of the plate 13 is shown in full lines and the other of such position is indicated in dotted lines. It is evident that the mechanism employed in this embodiment of the improvement for bending the plate 13 produces the same general effect as those previously described in changing the direction of greater distortion of the image, although in this device the gradual changes are in the approaches to and recessions from the plane or flat condition of the flexible reflecting-plate.

From the foregoing description it will be seen that the present invention includes within its scope any suitable form of reflector movably mounted and adapted to produce a symmetrical image of an object within its range upon different scales in different directions, regardless of the specific character of such reflector, which may be in the form of a simple mirror with cylindrically-curved operative face, as represented in Figs. 1 to 5, inclusive, of the accompanying drawings, or may be a single flexible plate, with highly-polished operative face and capability of such movement as to receive its curvature in different directions without bodily movement, as illustrated in Figs. 10, 11, and 12, or it may be in the form of a sectional mirror, having a series of operative faces either convexly or concavely arched or curved in different directions in respect of their direction of motion, as represented in Figs. 6, 7, 8, and 9.

It is further evident that the specific character of the motion communicated to said reflector and the kind of mechanism employed for such purpose are not material parts of the present improvement in its broader aspect, the essential characteristic of such mechanism being the movement of the reflector in such manner as to successively present, either continuously, as herein represented, or intermittingly, the operative portion of the same in different relations to the object to be reflected, so as to cause the production of a series of distorted images of the object, certain of which are symmetrical and reproduce the object upon a natural scale in one direction, but each differing from the adjacent images in the character of its distorted representation thereof.

While the present improvement may be used as a toy for mere amusement of the observers, it is designed particularly for installation in show-windows of stores and in other places of exhibition to arrest the attention of passers-by, and in some cases its use may be extended to advertisement of medical remedies, in connection with which it may be desired to illustrate, in exaggerated degree, the physical condition of the patient before and after using.

Having thus set forth the nature of the invention, what I claim herein is—

1. The combination with a mirror or reflector constructed and adapted to present to the object to be reflected an operative portion of simple curvature, of automatically-acting means for supporting and moving said mirror or reflector in progressively-varying angular relation to the direction of curvature of said operative portion to the object whereby a series of images of progressively-varying degree of distortion is produced.

2. The combination with a mirror or reflector adapted to expose to an object in a given position relative thereto a reflecting-surface of single curvature, of means for movably supporting said mirror or reflector and for presenting to said object said reflecting-surface in a succession of diverse angular relations, whereby a series of diversely-foreshortened symmetrical images of said object is produced.

3. The combination with a mirror or reflector provided with an operative portion adapted to produce a symmetrically-foreshortened image of an object disposed in a given position relative thereto, of means for supporting and communicating a circular movement to said mirror or reflector to progressively change the angular relation of its operative portion to said object, and thereby produce a series of images of said object certain of which are symmetrically foreshortened in different directions and the intermediate images are unsymmetrically distorted.

4. The combination with a rigid mirror or reflector having an arched or cylindrically-curved reflecting-face, of means for movably supporting the same and imparting thereto a circular movement to vary the direction of its curvature in respect of an object disposed in front of its reflecting-face.

5. The combination with a rigid mirror or reflector having a cylindrically-curved reflecting-face, of means for movably supporting the same and imparting thereto a rotary motion.

6. The combination with a rigid mirror or reflector having a cylindrically-curved reflecting-face, of a supporting-shaft for said mirror or reflector whose axis of motion is intersected by the axis of curvature of said reflecting-face, and means for imparting to said mirror or reflector rotary motion.

7. The combination with a standard and a shaft mounted thereon and provided with means for rotating it, of a cylindrically-curved mirror or reflector mounted upon said shaft with its axis of curvature disposed transversely of said shaft, and wholly exposed for reflection of an object arranged in front of the same in line with said shaft.

8. The combination with a standard and a shaft mounted thereon and provided with means for rotating it, of a cylindrically-curved convex mirror or reflector mounted upon said shaft with its axis of curvature disposed transversely of said shaft, and wholly exposed for reflection of an object arranged in front of the same in line with said shaft.

In testimony whereof I have signed my name to this specification in the presence of two subscribing witnesses.

FRIEDERICH MÜLLER.

Witnesses:
 A. D. SAWYER,
 ULTIMA MÜLLER.